(12) United States Patent
Kirchmeier et al.

(10) Patent No.: US 10,416,337 B2
(45) Date of Patent: Sep. 17, 2019

(54) INDUCTIVE DOWNHOLE SENSOR WITH CENTER TAP FOR COMMON MODE REJECTION

(71) Applicant: BAKER HUGHES INCORPORATED, Houston, TX (US)

(72) Inventors: Eduard Kirchmeier, Hannover (DE); Alexander Zlotnik, Hannover (DE)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 0 days.

(21) Appl. No.: 15/346,373

(22) Filed: Nov. 8, 2016

(65) Prior Publication Data

US 2017/0131427 A1 May 11, 2017

Related U.S. Application Data

(60) Provisional application No. 62/253,414, filed on Nov. 10, 2015.

(51) Int. Cl.
*E21B 47/04* (2012.01)
*E21B 47/06* (2012.01)
(Continued)

(52) U.S. Cl.
CPC ............ *G01V 3/28* (2013.01); *E21B 10/00* (2013.01); *E21B 44/00* (2013.01); *E21B 44/005* (2013.01);
(Continued)

(58) Field of Classification Search
CPC ........ E21B 47/04; E21B 47/042; E21B 47/06; E21B 47/0905; E21B 47/02216;
(Continued)

(56) References Cited

U.S. PATENT DOCUMENTS

| 4,857,852 A | 8/1989 | Kleinberg et al. |
| 5,508,616 A | 4/1996 | Sato et al. |

(Continued)

FOREIGN PATENT DOCUMENTS

WO 2012150934 A1 11/2012

OTHER PUBLICATIONS

Int'l Search Report & Written Opinion in PCT/US2016/062292 dated Feb. 16, 2017.

*Primary Examiner* — Nicole Coy
(74) *Attorney, Agent, or Firm* — Mossman, Kumar & Tyler, PC (57) ABSTRACT

Systems, methods, and devices for evaluation of an earth formation intersected by a borehole using a logging tool. Methods include generating an excitation in the formation with an electromagnetic (EM) signal from a transmitter assembly at at least one frequency; making EM measurements using an EM tool on a tool string in the borehole by receiving a signal at at least one receiver assembly responsive to the excitation; wherein the at least one receiver assembly includes an induction antenna comprising a first winding and a second winding that share a common center tap, and wherein the average potential on the induction antenna is substantially the same as a ground potential. The receiver assembly or transmitter assembly may comprise a receiver or transmitter electrically connected to the induction antenna by a balun transformer, and a capacitive shield encompassing the induction antenna, the capacitive shield comprising a meander shaped isolation gap.

19 Claims, 7 Drawing Sheets

(51) Int. Cl.
  *G01V 3/28* (2006.01)
  *E21B 10/00* (2006.01)
  *E21B 49/00* (2006.01)
  *G01V 3/30* (2006.01)
  *E21B 44/00* (2006.01)

(52) U.S. Cl.
  CPC .............. *E21B 47/04* (2013.01); *E21B 47/06* (2013.01); *E21B 49/00* (2013.01); *G01V 3/30* (2013.01)

(58) Field of Classification Search
  CPC ....... E21B 47/082; E21B 47/122; G01V 3/28; G01V 3/30
  See application file for complete search history.

(56) References Cited

U.S. PATENT DOCUMENTS

| | | |
|---|---|---|
| 5,781,436 A | 7/1998 | Forgang et al. |
| 6,690,170 B2 | 2/2004 | Homan et al. |
| 6,856,909 B2 | 2/2005 | Banning-Geertsma |
| 6,969,994 B2 | 11/2005 | Minerbo et al. |
| 7,212,173 B2 | 5/2007 | Chen et al. |
| 2004/0217763 A1 | 11/2004 | Moore |
| 2005/0049791 A1 | 3/2005 | Bespalov et al. |
| 2006/0202806 A1 | 9/2006 | Bonner et al. |
| 2007/0205770 A1 | 9/2007 | Fanini et al. |

INDUCTIVE DOWNHOLE SENSOR WITH CENTER TAP FOR COMMON MODE REJECTION

CROSS REFERENCE TO RELATED APPLICATIONS

This application claims priority from U.S. Provisional Patent Application Ser. No. 62/253,414 filed Nov. 10, 2015, which is incorporated herein by reference in its entirety.

FIELD

In one aspect, the present disclosure generally relates to methods, systems, and devices for earth formation evaluation including determining properties of the earth formation. More specifically, the present disclosure relates to electromagnetic logging in a borehole penetrating the earth formation. These measurements may be used in exploration for hydrocarbons and/or water in the earth formation.

BACKGROUND

Electrical well logging is well known and various devices and various techniques have been described for this purpose. Properties of the formation may be estimated by creating electromagnetic (EM) excitation in the formation with at least one transmitter, and receiving related signals at one or more receiver antennas. Estimation of these properties aids in understanding the structure of the earth formation, which enables and/or facilitates exploration and development of the formation.

Logging instruments may be used to estimate parameters of interest, such as formation properties used for characterizing, modeling, and conducting operations on the formation. Historically, measurements of resistivity, or its inverse, conductivity, have been used for, among other reasons, inferring the fluid content of the earth formations and distances to bed boundaries. Also, lower conductivity (higher resistivity) measurements may be indicative of hydrocarbon-bearing earth formations.

SUMMARY

In aspects, the present disclosure is related to systems, methods and devices for evaluating an earth formation intersected by a borehole using a logging tool. Methods include generating an excitation in the formation with an electromagnetic (EM) signal from a transmitter assembly at at least one frequency; making EM measurements using an EM tool on a tool string in the borehole by receiving a signal at at least one receiver assembly responsive to the excitation; wherein the at least one receiver assembly includes an induction antenna comprising a first winding and a second winding that share a common center tap, and wherein average potential on the induction antenna is substantially the same as a ground potential.

The center tap may maintain a virtual ground potential. The at least one receiver assembly may comprise a plurality of induction antennas with each antenna of the plurality separated from the other of the antennas of the plurality by a segment of the tool string, and a corresponding first winding and a corresponding second winding that share a corresponding common center tap. The first winding and the second winding may overlap on the tool string. The receiver assembly may comprise a receiver electrically connected to the induction antenna by a balun transformer. The transmitter assembly may be on the tool string, and the transmitter assembly may comprise a transmitter operatively electrical connected to an induction antenna by a balun transformer.

Other methods include generating an excitation in the formation with an electromagnetic (EM) signal from a transmitter assembly at at least one frequency; making EM measurements using an EM tool on a tool string by receiving a signal at at least one receiver assembly responsive to the excitation; wherein the at least one receiver assembly includes an induction antenna comprising a first winding and a second winding that share a common center tap, and a capacitive shield encompassing the induction antenna, the capacitive shield comprising a meander shaped isolation gap. The center tap may maintain a virtual ground potential. The at least one receiver assembly may comprise a plurality of induction antennas with each antenna of the plurality separated from the other of the antennas of the plurality by a segment of the tool string, and a corresponding first winding and a corresponding second winding that share a corresponding common center tap. The first winding and the second winding may overlap on the tool string. The receiver assembly may comprise a receiver electrically connected to the induction antenna by a balun transformer. The average potential on the induction antenna may be substantially the same as a ground potential. The transmitter assembly may be on the tool string, and the transmitter assembly may comprise a transmitter operatively electrical connected to an induction antenna by a balun transformer.

Apparatus embodiments may include a tool string; an electromagnetic (EM) tool on the tool string configured to generate an excitation in the formation with an EM signal from a transmitter assembly on the tool at at least one frequency; at least one receiver assembly on the EM tool configured to make EM measurements by receiving a signal at the at least one receiver assembly responsive to the excitation. The at least one receiver assembly may include an induction antenna comprising a first winding and a second winding that share a common center tap. The tool string may be a drill string, and the apparatus may comprise a drill bit at a distal end of the drill string.

The apparatus may include at least one processor configured to estimate a parameter of interest of the formation using EM measurements. The processor may be further configured to carry out methods of the present disclosure as described herein. The at least one processor may include one or more computer processors operatively coupled with at least one computer memory and configured so the computer memory is accessible to the at least one processor. The computer memory may be implemented as a non-transitory computer readable medium having disposed thereon computer program instructions for implementing the methods described herein.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure generally relates to evaluation of an earth formation, which may include exploration for hydrocarbons involving electromagnetic investigations of a borehole penetrating the earth formation. These investigations may include estimating at least one parameter of interest of the earth formation.

Aspects of the present disclosure relate to apparatus and methods for electromagnetic well logging for evaluating an earth formation. More specifically, the present disclosure relates to estimating and displaying properties of the formation relating to electromagnetic (EM) measurements. The formation may be intersected by a wellbore and the measurements may be taken in the wellbore. The EM measurements may be used to estimate the parameter of interest. Aspects of the present disclosure facilitate the display and analysis of EM measurements. Further aspects may include methods for conducting a drilling operation by estimating the parameter of interest (e.g., resistivity) in real-time during the drilling operation and conducting the drilling operation in dependence upon the estimate.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Downhole electromagnetic measurement tools are well known in the art. Inductive sensors are used in downhole tools, particularly in logging-while-drilling ('LWD') and measurement-while-drilling ('MWD') contexts. The basic topology often consists of one or more transmitters associated with one or more respective receivers.

Aspects of the present disclosure may include various components for performing an electromagnetic excitation including exciting currents or electric (or magnetic) fields, generating electromagnetic waves, or other electrical phenomena in a formation surrounding a borehole, and for sensing electrical effects of the generated phenomena, such as, for example, a plurality of coils. A component (e.g., a coil or a ring electrode) referred to herein as a transmitter may generate an oscillating signal in an adjacent geological formation, e.g., by supplying a square wave signal or other oscillating signal to a coil. Any number of oscillating voltage signals having multiple frequency components may be used. It may also be desirable that, on occasion, a single-frequency signal, such as a sinusoidal signal, is used. One application for downhole measurements is formation evaluation, where the goal is to evaluate the oil content of a possible reservoir.

On the transmitter side an electromagnetic field is generated in the formation. The electrical properties of the formation are contained in the receiver response. In certain cases, the measurement is distorted and the results cannot be evaluated due to common mode coupling between the transmitter and the receiver. This is particularly problematic in scenarios with non-conductive mud and a highly conductive formation, where the tool body and the formation create a capacitor with the mud acting as a dielectric. A parasitic common mode component of the signal is introduced by the capacitive coupling between the unbalanced sensor coil and the formation. Through this capacitive coupling effect a common mode signal is transmitted from the transmitter to the receiver. This parasitic amount of the signal superposes with the desired main signal in a timely changing way accordingly to the drilling dynamics.

As the voltages on the transmitter side are very high for extra deep reading tools, the common mode signal level becomes critical. This signal superposes with the desired main signal and causes inaccuracies in the measurement. The reason for the susceptibility to this common mode signal is the low Common Mode Rejection Ratio ('CMRR'). The unwanted signal can be effectively suppressed by changing the sensor design in a way that offers a low impedance path for the common mode component.

Aspects of the present disclosure work cooperatively to increase CMRR and mitigate effects of common mode on the measurements. One general embodiment is a tool comprising at least one receiver antenna.

The tool may also include either or both of a capacitive shield for the respective sensor coils and a transmitter having a balanced/unbalanced transformer ('balun') applied. The balun creates a balanced output, which leads to a reduced common mode coupling to the formation. The capacitive shield reduces the coupling efficiency for the common mode component of the signal, but the shield must be arranged in a way that does not increase eddy currents near the sensor.

Figure 1A:
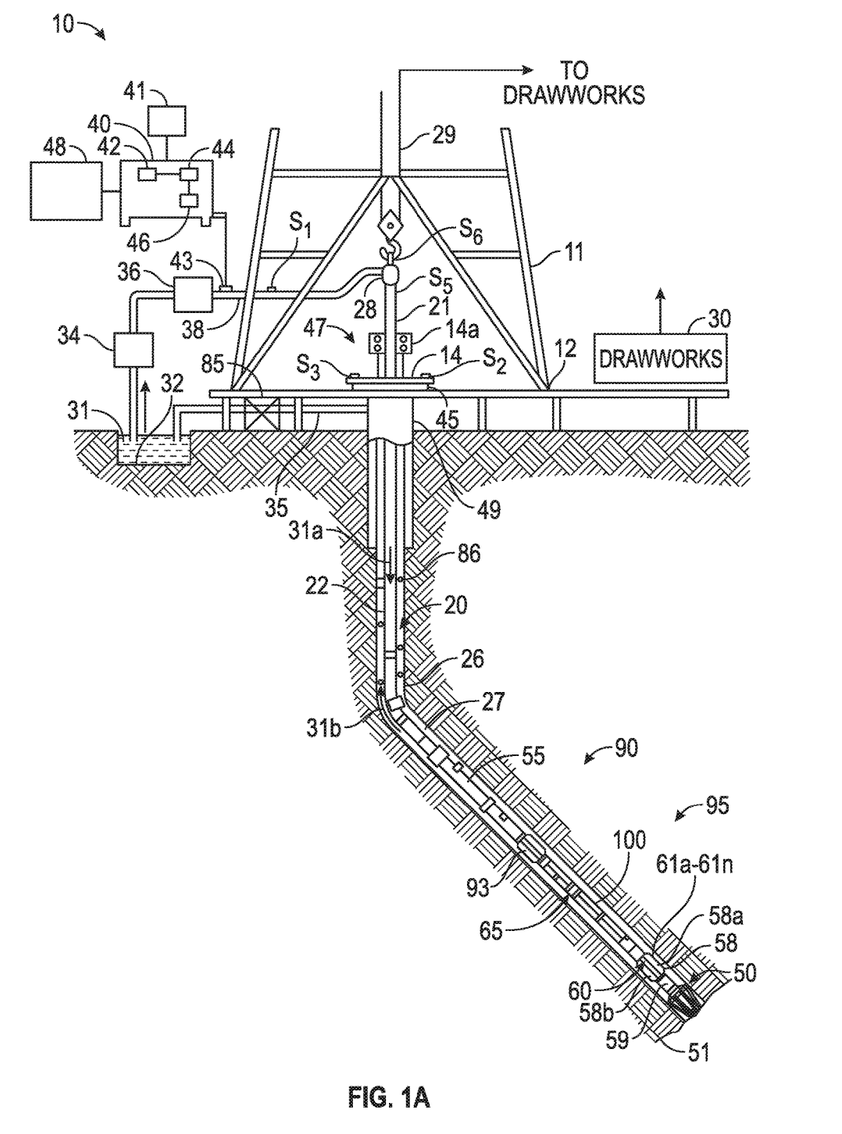
FIG. 1A shows an exemplary embodiment of a system for evaluation of an earth formation using measurements from a downhole electromagnetic tool.

FIG. 1A shows an exemplary embodiment of a system for evaluation of an earth formation using measurements from a downhole electromagnetic tool. The system 10 includes a carrier 11 that is shown disposed in a wellbore or borehole 26 that penetrates at least one earth formation 95. The system 10 also includes a tool 100 configured for taking electromagnetic measurements in the borehole in order to generate measurement information.

As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

FIG. 1A shows a drill string 20 including a bottomhole assembly (BHA) 90 conveyed in the borehole 26 as the carrier. The drilling system 10 includes a conventional derrick 11 erected on a platform or floor 12 which supports a rotary table 14 that is rotated by a prime mover, such as an electric motor (not shown), at a desired rotational speed. A tubing (such as jointed drill pipe 22), having the drilling assembly 90, attached at its bottom end extends from the surface to the bottom 51 of the borehole 26. A drill bit 50, attached to drilling assembly 90, disintegrates the geological formations when it is rotated to drill the borehole 26. The drill string 20 is coupled to a drawworks 30 via a Kelly joint 21, swivel 28 and line 29 through a pulley. Drawworks 30 is operated to control the weight on bit ("WOB"). The drill string 20 may be rotated by a top drive (not shown) instead of by the prime mover and the rotary table 14. Alternatively, a coiled-tubing may be used as the tubing 22. A tubing injector 14a may be used to convey the coiled-tubing having the drilling assembly attached to its bottom end. The operations of the drawworks 30 and the tubing injector 14a are known in the art and are thus not described in detail herein.

It should be understood that embodiments of the present disclosure are well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

A suitable drilling fluid 31 (also referred to as the "mud") from a source 32 thereof, such as a mud pit, is circulated under pressure through the drill string 20 by a mud pump 34. The drilling fluid 31 passes from the mud pump 34 into the drill string 20 via a desurger 36 and the fluid line 38. The drilling fluid 31a from the drilling tubular discharges at the borehole bottom 51 through openings in the drill bit 50. The returning drilling fluid 31b circulates uphole through the annular space 27 between the drill string 20 and the borehole 26 and returns to the mud pit 32 via a return line 35 and drill cutting screen 85 that removes the drill cuttings 86 from the returning drilling fluid 31b. A sensor S1 in line 38 provides information about the fluid flow rate. A surface torque sensor S2 and a sensor S3 associated with the drill string 20 respectively provide information about the torque and the rotational speed of the drill string 20. Tubing injection speed is determined from the sensor S5, while the sensor S6 provides the hook load of the drill string 20.

Well control system 47 is placed at the top end of the borehole 26. The well control system 47 includes a surface blow-out-preventer (BOP) stack 15 and a surface choke 49 in communication with a wellbore annulus 27. The surface choke 49 can control the flow of fluid out of the borehole 26 to provide a back pressure as needed to control the well.

In some applications, the drill bit 50 is rotated by only rotating the drill pipe 22. However, in many other applications, a downhole motor 55 (mud motor) disposed in the BHA 90 also rotates the drill bit 50. The rate of penetration (ROP) for a given BHA largely depends on the WOB or the thrust force on the drill bit 50 and its rotational speed.

A surface control unit or controller 40 receives signals from the downhole sensors and devices via a sensor 43 placed in the fluid line 38 and signals from sensors S1-S6 and other sensors used in the system 10 and processes such signals according to programmed instructions provided to the surface control unit 40. The surface control unit 40 displays desired drilling parameters and other information on a display/monitor 41 that is utilized by an operator to control the drilling operations. The surface control unit 40 may be a computer-based unit that may include a processor 42 (such as a microprocessor), a storage device 44, such as a solid-state memory, tape or hard disc, and one or more computer programs 46 in the storage device 44 that are accessible to the processor 42 for executing instructions contained in such programs. The surface control unit 40 may further communicate with a remote control unit 48. The surface control unit 40 may process data relating to the drilling operations, data from the sensors and devices on the surface, and data received from downhole; and may control one or more operations of the downhole and surface devices. The data may be transmitted in analog or digital form.

The BHA 90 may include a tool 100 configured for performing electromagnetic (EM) measurements. The BHA 90 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 95 surrounding the BHA 50. For convenience, all such sensors are generally denoted herein by numeral 65. The BHA 90 may further include a variety of other sensors and devices 59 for determining one or more properties of the BHA 90, such as vibration, bending moment, acceleration, oscillations, whirl, stick-slip, weight-on-bit, fluid flow rate, pressure, temperature, rate of penetration, azimuth, tool face, drill bit rotation, etc.

The BHA 90 may include a steering apparatus or tool 58 for steering the drill bit 50 along a desired drilling path. In one aspect, the steering apparatus may include a steering unit 60, having a number of force application members 61a-61n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 58 having a bent sub and a first steering device 58a to orient the bent sub in the wellbore and the second steering device 58b to maintain the bent sub along a selected drilling direction. The steering unit 58, 60 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 20 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 93 on the BHA 90. The processor(s) can be a microprocessor that uses a computer program implemented on a suitable non-transitory computer-readable medium that enables the processor to perform the control of system 10 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 42 can process the surface measured data, along with the data transmitted from the downhole processor, to evaluate the formation.

Figure 1B:
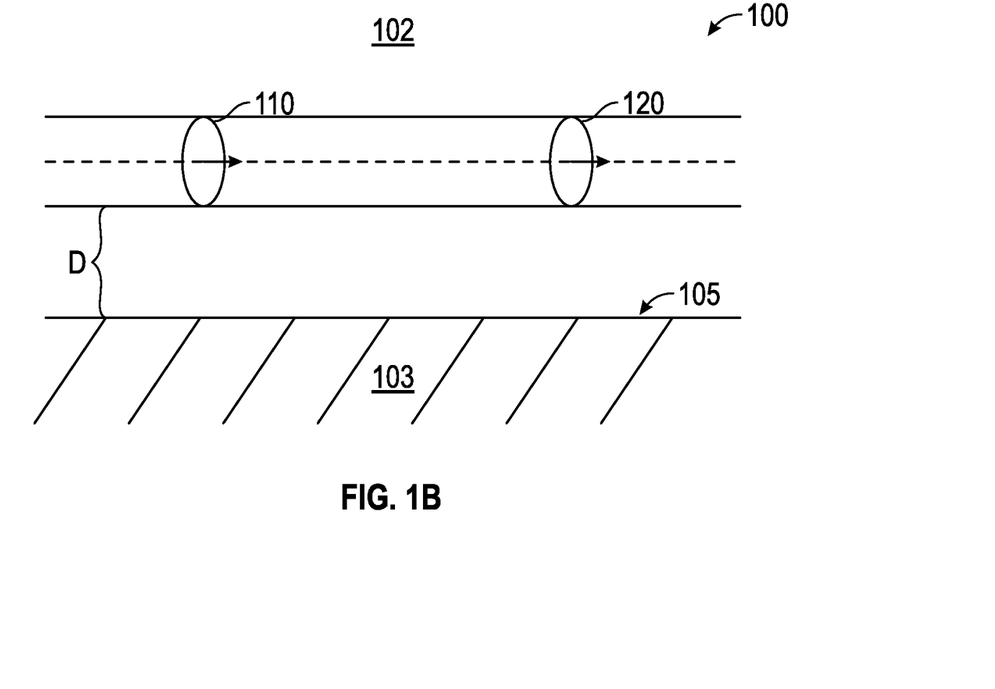
FIG. 1B illustrates an EM tool in a subterranean environment in accordance with embodiments of the present disclosure.

A point of novelty of the system illustrated in FIGS. 1A & 1B is that the surface processor 42 and/or the downhole processor 93 are configured to perform certain methods (discussed below) that are not in the prior art. Surface processor 42 or downhole processor 93 may be configured to control steering apparatus 58, mud pump 34, drawworks 30, rotary table 14, downhole motor 55, other components of the BHA 90, or other components of the drilling system 10. Surface processor 42 or downhole processor 93 may be configured to control sensors described above and to generate measurement information, including estimation a parameter of interest according to methods described herein. Aspects of the disclosure include using at least one processor to perform at least one of: i) storing the measurement information in a computer memory; ii) transmitting the measurement information uphole; iii) processing the measurement information in the borehole; or iv) displaying the measurement information to an operating engineer.

Control of these components may be carried out using one or more models using methods described below. For example, surface processor 42 or downhole processor 93 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 42, downhole processor 93, or other processors (e.g. remote processors) may be configured to operate the EM tool 100 to excite and measure EM signals.

The system 10 may include any number of downhole tools for various processes including formation drilling, geosteering, and formation evaluation (FE) for measuring versus depth and/or time one or more physical quantities in or around a borehole. The tool 100 may be included in or embodied as a BHA, drillstring component or other suitable carrier.

While a drill string 20 is shown as a conveyance device for tool 100, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 10 may include a bottomhole assembly and/or sensors and equipment for implementation of embodiments of the present disclosure on either a drill string or a wireline. "Carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensors may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging.

FIG. 1B illustrates an EM tool 100 in a subterranean environment in accordance with embodiments of the present disclosure. The tool 100 may include a transmitter assembly 110 and a receiver assembly 120 disposed along drillstring 120. Other embodiments may include additional transmitter or receiver assemblies. The transmitter assembly 110 may be configured to excite electromagnetic phenomena in the formation. For example, the transmitter assembly 110 may include a sensor coil or a ring electrode coupled with a transmitter, which is connected to a current source. The receiver assembly 120 may be configured to convert an electromagnetic signal received at a sensor coil responsive to the phenomena into an output signal.

Many variations in transmitter and receiver configurations may be successfully employed. Transmitter and receiver assemblies may vary in number, location (e.g., with respect to the tool, to one another, to the drill bit, and so on) and orientation (e.g., transverse, longitudinal, tilted, etc.). Some embodiments may include bucking coils or other bucking components. Various sensor arrays of differing types may be placed on the BHA, a number of subs on the drill string, or various combinations of these. As one example, the techniques of the present disclosure are amenable for use with the 3DEX® tool, such as, for example, in connection with anisotropic formation media, or the Rt eXplorer (RTeX) tool, both provided by BAKER HUGHES INCORPORATED.

As non-limiting examples, each transmitter or receiver of the logging tools herein may be configured as a loop antenna, a coil antenna, a monopole antenna, a dipole antenna, an antenna array, a patch antenna, a reflector antenna, a log-periodic antenna, a ring electrode, directional electrode arrays, and so on, including combinations of the above. Each transmitter or receiver may be configured to operate at a plurality of frequencies. Each transmitter or receiver may be configured to have a limited frequency range and tuned to discrete frequencies.

In operation, tool 100 is configured to effect changes in the transmitter to generate an electromagnetic excitation in the formation at at least one frequency. Signals occur in the sensor coil of the receiver responsive to the EM excitation. The signal contains information about formation characteristics. Thus, the receiver produces a response indicative of formation characteristics, such as the parameter of interest. A processor is configured to measure signals.

It should be noted that the coaxial transmitter-receiver configuration shown herein is not to be construed as a limitation and any suitable arrangement including but not limited to an arrangement having a transverse transmitter and/or a transverse receiver may be used.

Figure 2A:
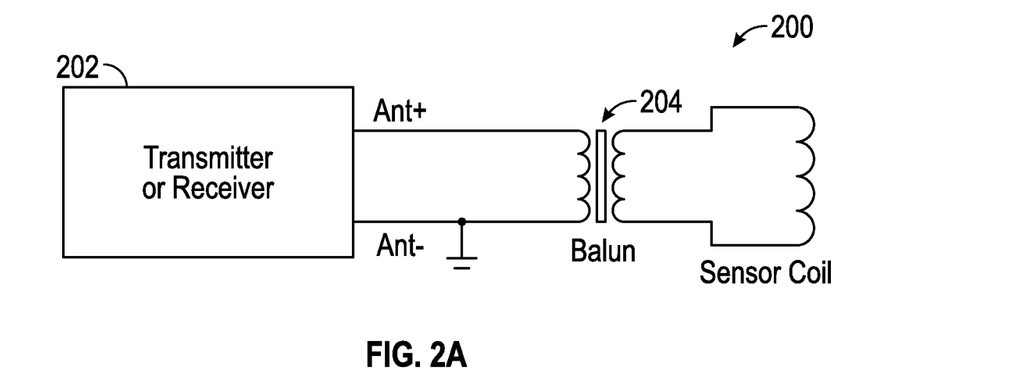
FIG. 2A depicts an electrical schematic of a transmitter assembly of the tool.

FIG. 2A depicts an electrical schematic of a transmitter assembly of the tool. The transmitter assembly 200 includes a transmitter 202 providing a signal. The transmitter 202 is operatively electrically connected to a sensor coil 206 via a balun transformer 204. The balun transformer creates an output signal which is symmetrical to ground. Therefore the average potential on the sensor coil is substantially the same as the ground potential. This minimizes the coupling effect to the formation. For the implementation of the balun, several winding topologies may be applied. The balun 204 may be used as a part of load matching network between the transmitter or receiver and the sensor coil. In practical applications a CMRR of 30 dB to 50 dB can be reached using a number of windings between 25 and 50, for an inductance of approximately 1000-1500 uH.

The tool 200 may be configured for induction logging (e.g., based on standing waves and generally less than 100 kHz), multi-array wave propagation logging (e.g., 100 kHz to 10 GHz), and so on as known in the art.

Figure 2B:
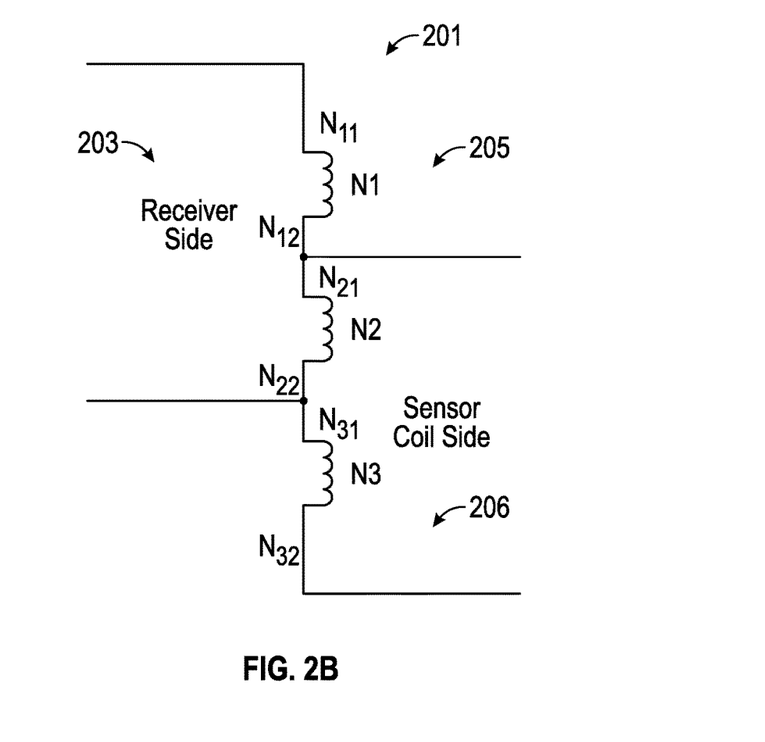
FIG. 2B depicts an electrical schematic of a receiver assembly of the tool.

FIG. 2B depicts an electrical schematic of a receiver assembly of the tool. The receiver assembly 201 includes a receiver 203 providing a signal. The receiver 203 is operatively electrically connected to a sensor coil 206 via a balun transformer 205.

Figure 3:
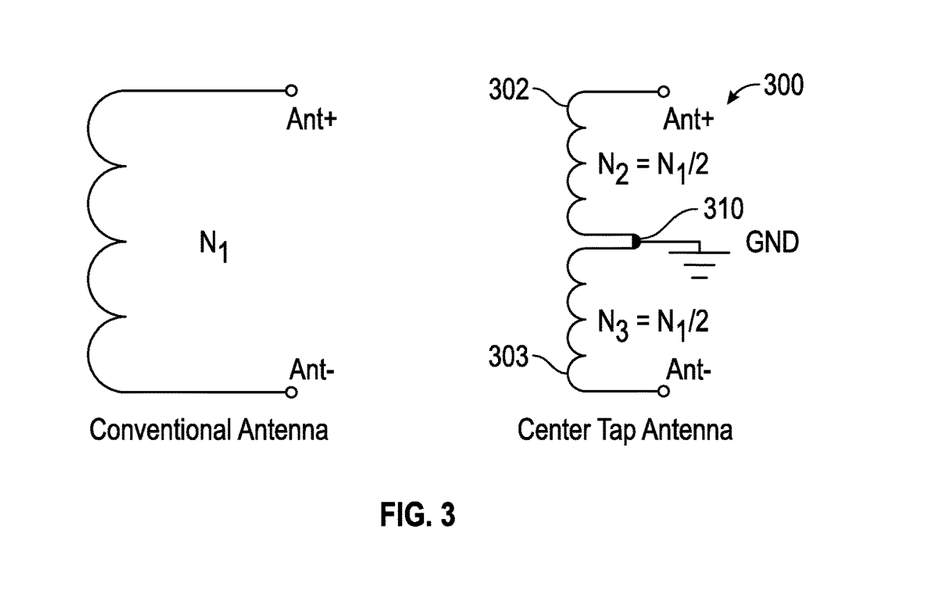
FIG. 3 depicts an electrical schematic of an induction antenna for the sensor coils of a logging tool for evaluating an earth formation in accordance with embodiments of the present disclosure.

FIG. 3 depicts an electrical schematic of an induction antenna for the sensor coils of a logging tool for evaluating an earth formation in accordance with embodiments of the present disclosure. Induction antenna 300 is made up of $N_1$ turns, and includes a first winding 302 having and second winding 303. The first winding 302 is made up of $N_2$ turns and forms the upper end of antenna 300 while the second winding 303 is made up of $N_3$ turns and forms the lower end of antenna 300. The windings 302, 303 are operatively electrically coupled together at a center tap 310 connected to ground.

Figure 4A:
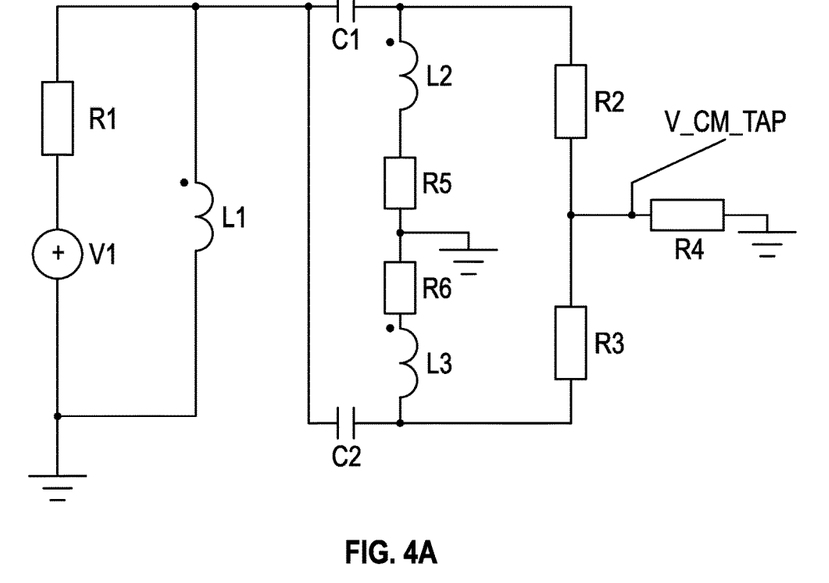
FIG. 4A depicts an electrical model of a receiver antenna for the sensor coils of a logging tool for evaluating an earth formation in accordance with embodiments of the present disclosure.
Figure 4B:
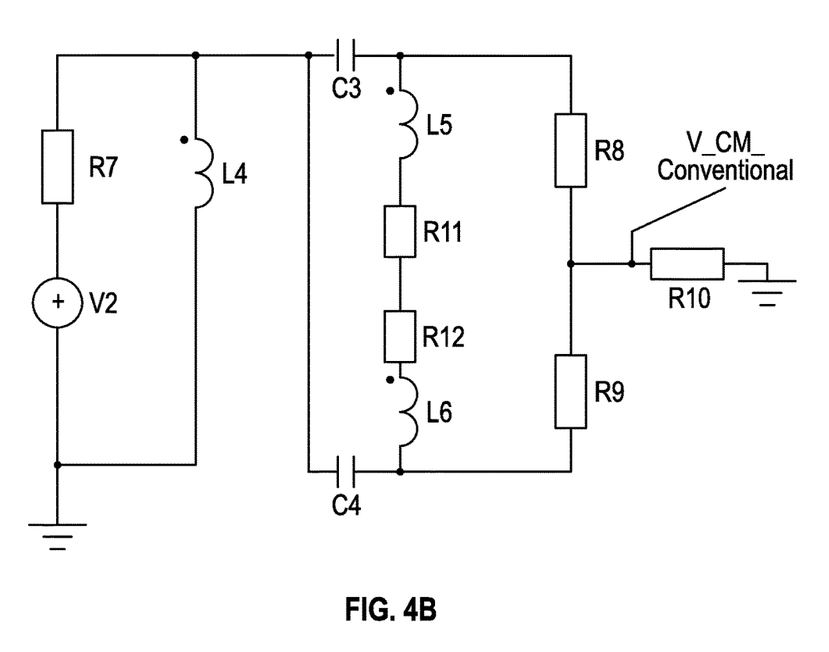
FIG. 4B depicts an electrical model of a conventional receiver antenna for the sensor coils of an induction logging tool.

FIG. 4A depicts an electrical model of a receiver antenna for the sensor coils of a logging tool for evaluating an earth formation in accordance with embodiments of the present disclosure. The common mode signal (V1) is coupled over the capacitive coupling effect represented by capacitors C1, C2 to the receiver side, represented by inductors L2, L3. FIG. 4B depicts an electrical model of a conventional receiver antenna for the sensor coils of an induction logging tool. The common mode signal (V2) is coupled over the capacitive coupling effect represented by capacitors C3, C4 to the receiver side, represented by inductors L5, L6.

Figure 5:
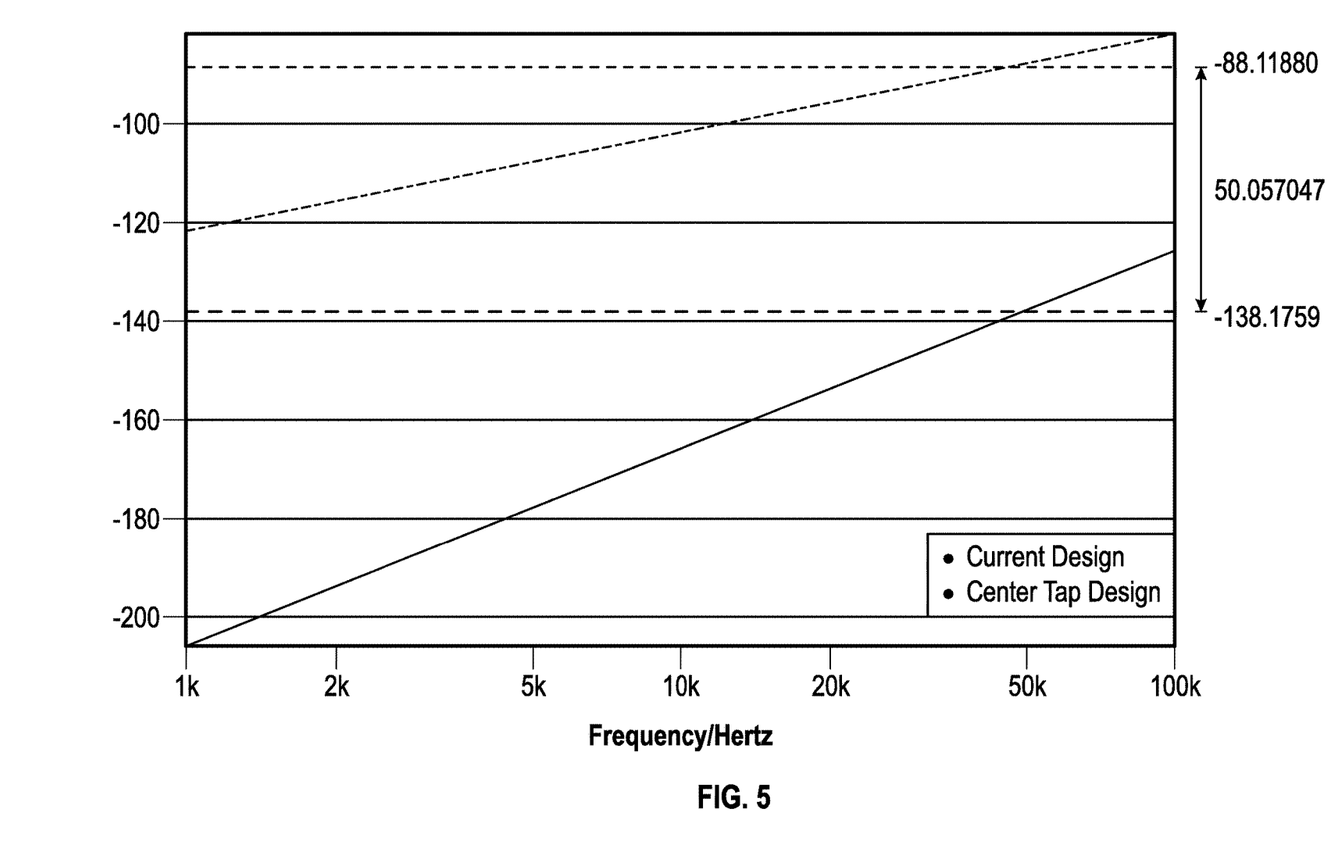
FIG. 5 illustrates simulation results for the receiver antenna in accordance with embodiments of the present disclosure.

FIG. 5 illustrates simulation results for the receiver antenna design of FIG. 4A. The simulated common mode rejection of the center tap antenna is about 50 dB better at 50 kHz in comparison to the conventional design. One explanation of the physical phenomena causing this improvement is that, due to the center tap, the receiver antenna is in parallel to the input impedance of the signal amplifier. This creates a low impedance voltage divider. Therefore only a small common mode voltage is being measured.

Figure 6A:
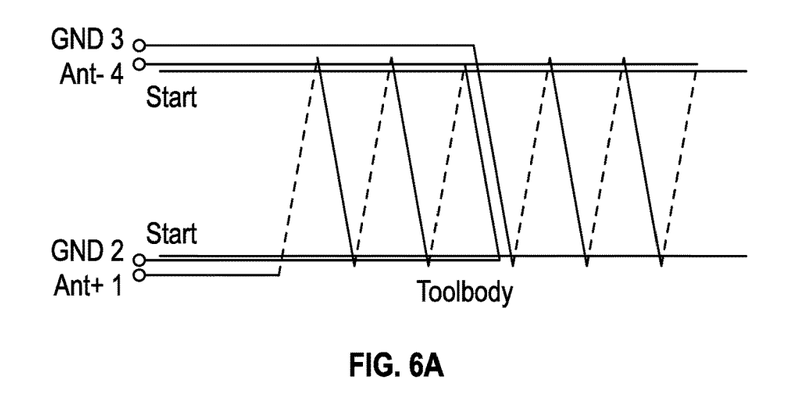
FIGS. 6A & 6B illustrate coil windings in accordance with embodiments of the present disclosure.
Figure 6B:
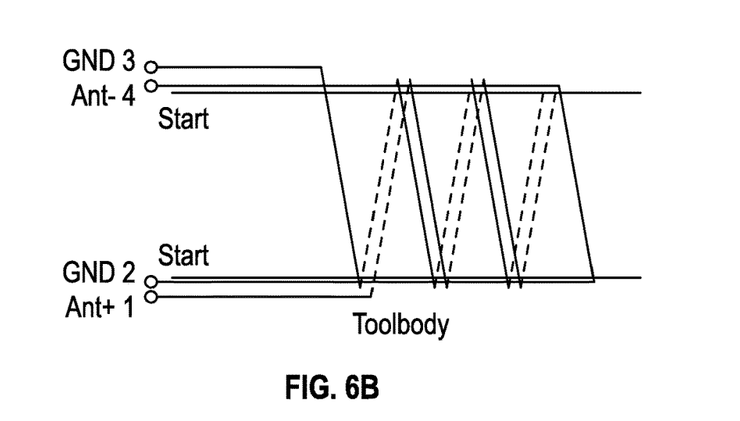

FIGS. 6A & 6B illustrate coil windings in accordance with embodiments of the present disclosure. FIG. 6A illustrates a serial winding 600. FIG. 6B illustrates a bifilar winding 601. That is, winding 601 comprises two closely spaced, parallel windings.

Figure 7:
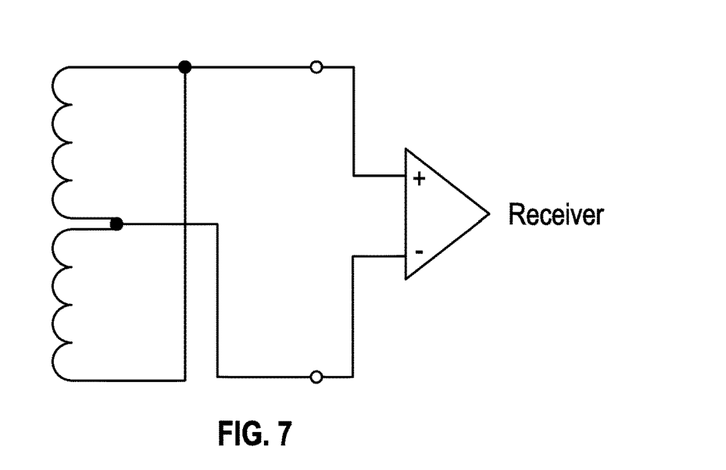
FIG. 7 illustrates a short-circuited antenna for measurement of common mode.

A test system was constructed for laboratory tests of a tool in accordance with embodiments of the present disclosure. The test system includes an LWD tool. A conventional antenna and a center tap antenna in accordance with the present disclosure were included on the tool in a symmetric configuration. An aluminum sleeve was mounted over the antennas without galvanic connection. In addition, a signal generator was connected to the sleeves as a source of a common mode signal. The signal generator was set to provide a sinusoidal signal at 200 mV and 49.8 kHz. Referring to FIG. 7, the antennas were shorted for differential signals so that only the common mode would be detectable. The capacitive coupling effect was then investigated by this assembly. The results are indicated in the table below.

| Mode | Common mode voltage |
| --- | --- |
| conventional antenna | 102 dBuV |
| center tap antenna (serial winding) | 46 dBuV |
| center tap antenna (bifilar winding) | 41 dBuV |

The results show that the center tap antenna with serial winding has a 56 dB better common mode rejection than the conventional antenna. The bifilar winding configuration shows a 61 dB improvement. In one interpretation, the different performance between the winding methods is caused by a difference between the coupling factors of the inductances. Therefore an impedance analyzer was used to determine the inductances and the coupling factor. The coupling factor of a bifilar winding compared to a conventional winding may be improved by more than 30 percent in some instances, as verified by laboratory measurements. The self-resonance frequency of the bifilar winding was measured as 36% lower than the conventional design (710 kHz to 454 kHz) while the inductance and quality factor remained the same.

Figure 8:
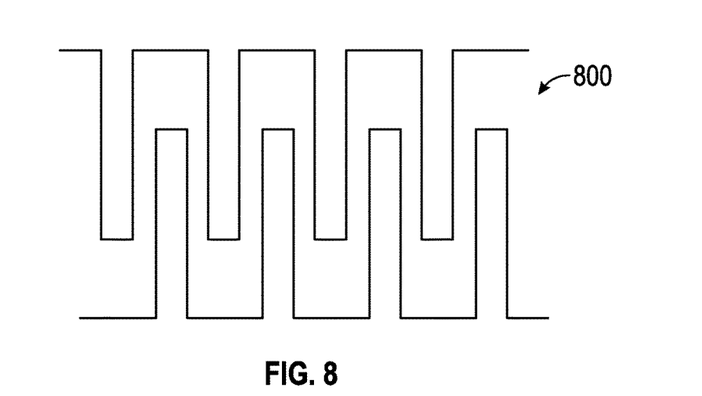
FIG. 8 illustrates a capacitive shield for an EM logging tool in accordance with embodiments of the present disclosure.

FIG. 8 illustrates a capacitive shield for an EM logging tool in accordance with embodiments of the present disclosure. The capacitive shield overlays the induction antenna so that the antenna is encompassed by the capacitive shield. The capacitive shield 800 comprises a meander shaped isolation gap. The isolation gap may be filled with a non-conductive material having a thickness, for example, of between 0.5 and 10 millimeters.

Issues with estimating resistivity parameters or other parameters of interest in a logging-while-drilling ('LWD') or measurement-while-drilling ('MWD') context may stem from both the imprecision of conventional models and the constraints of timely delivering the estimate. Because the BHA is constantly advancing, information regarding the properties of the volume of the earth formation the tool is currently located in and its relationship with other parts of the formation must be delivered in a substantially real-time manner to usefully employ the information for the purposes of steering the BHA (e.g., geosteering).

Figure 9:
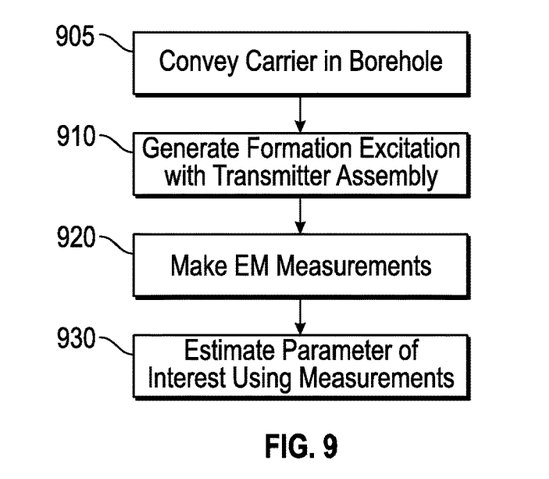
FIG. 9 illustrates methods for evaluating an earth formation intersected by a borehole in accordance with embodiments of the present disclosure.

FIG. 9 illustrates methods for evaluating an earth formation intersected by a borehole in accordance with embodiments of the present disclosure. Optional step 905 of method 900 comprises conveying a carrier into a borehole intersecting the formation. The carrier may be a component of a tool string. In some examples the carrier may be a component of a drillstring, and conveyance of the drillstring may be carried out by advancing the drillstring and extending the borehole via rotation of a drill bit.

Optional step 910 comprises generating an excitation in the formation with an electromagnetic (EM) signal from a transmitter assembly at at least one frequency. As one example, a propagating wave may be excited using a transmitter as part of an EM tool as described above. The EM tool may include several connected or unconnected subs. Optional step 920 comprises making EM measurements using an EM tool on a tool string in the borehole by receiving a signal at at least one receiver assembly responsive to the excitation.

Steps 910 and 920 may be carried out by using at least one processor to direct or control transmitters and receivers directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., currents, charges, fields, standing waves, or propagating waves, etc). The at least one receiver assembly may include an induction antenna comprising a first winding and a second winding that share a common center tap, and wherein the average potential on the induction antenna is substantially the same as a ground potential. The center tap may maintain a virtual ground potential. The at least one receiver assembly may include an induction antenna comprising a first winding and a second winding that share a common center tap, and a capacitive shield encompassing the induction antenna. The capacitive shield may comprise a meander shaped isolation gap. The first winding and the second winding may overlap on the tool string.

Step 930 comprises estimating, for all the measurements, or at each of a plurality of borehole depths, a parameter of interest of the formation in which the tool is located. This may be carried out in substantially real time while on a single logging run while drilling. See, for example, U.S. Pat. No. 7,027,922 to Bespalov et al, commonly owned and herein incorporated by reference, relating to estimation of formation resistivity.

Other optional steps include conducting secondary recovery operations in dependence upon the estimated parameter of interest. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular values of estimated true resistivity.

Figure 10:
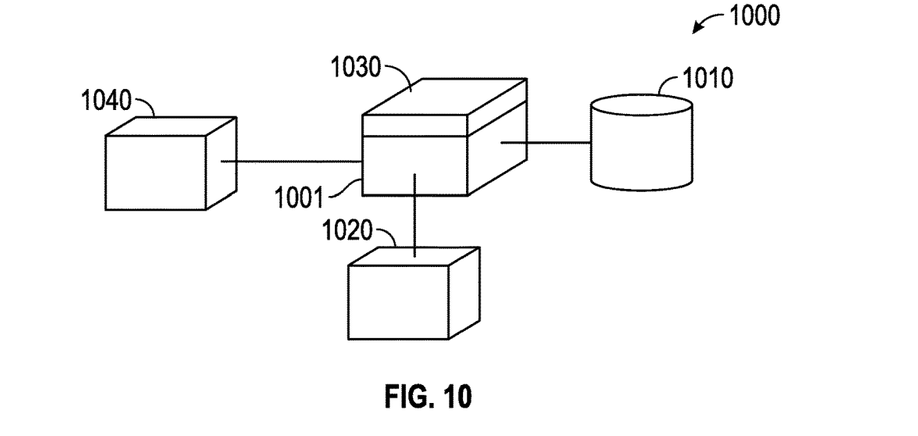
FIG. 10 illustrates a hardware environment in accordance with embodiments of the present disclosure.

FIG. 10 shows an information processing system 1000, which may be implemented with a hardware environment that includes a processor 1001, an information storage medium 1010, an input device 1020, processor memory 1030, and may include peripheral information storage medium 1040. The hardware environment may be in the well, at the rig, or at a remote location. Moreover, the several components of the hardware environment may be distributed among those locations. The input device 1020 may be any data reader or user input device, such as data card reader, keyboard, USB port, etc. The information storage medium 1010 stores information provided by the detectors. Information storage medium 1010 may include any non-transitory computer-readable medium for standard computer information storage, such as a USB drive, memory stick, hard disk, removable RAM, EPROMs, EAROMs, flash memories, optical disks, hard disks, or other commonly used memory storage system known to one of ordinary skill in the art including Internet or network based storage. Information storage medium 1010 stores a program that when executed causes information processor 1001 to execute the disclosed methods. Information storage medium 1010 may also store the formation information provided by the user, or the formation information may be stored in a peripheral information storage medium 1040, which may be any standard computer information storage device, such as a USB drive, memory stick, hard disk, removable RAM, or other commonly used memory storage system known to one of ordinary skill in the art including Internet or network based storage. Processor 1001 may be any form of processor or mathematical processing hardware, including Internet or network based hardware. When the program is loaded from information storage medium 1010 into processor memory 1030 (e.g. computer RAM), the program, when executed, causes information processor 1001 to retrieve sensor information from either information storage medium 1010 or peripheral information storage medium 1040 and process the information to estimate a parameter of interest. Processor 1001 may be located on the surface or downhole (e.g., downhole tool 100).

Implicit in the processing of the data is the use of logic implemented on a suitable medium, such as computer program instructions on non-transitory machine-readable medium (non-transitory computer-readable medium), that enables a processor to perform the control and processing. Aspects of the disclosure include using at least one processor to perform at least one of: i) storing the measurements in a computer memory; ii) transmitting the measurements uphole; iii) processing the measurements in the borehole; or iv) displaying of the measurements to an operating engineer.

In several non-limiting aspects of the disclosure, a processor includes a computer that executes programmed instructions for performing various methods. These instructions may provide for equipment operation, control, data collection and analysis and other functions in addition to the functions described in this disclosure. Thus, configuration of the processor may include operative connection with resident memory and peripherals for executing programmed instructions. The processor may execute instructions stored in computer memory accessible to the processor, or may alternatively employ logic implemented as field-programmable gate arrays ('FPGAs'), application-specific integrated circuits ('ASICs'), other combinatorial or sequential logic hardware, and so on.

In some embodiments, estimation of true resistivity or control of operations may involve applying a model. The model may include, but is not limited to, (i) a mathematical equation, (ii) an algorithm, (iii) a database of associated parameters, or a combination thereof.

The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. Measurement information comprises information derived from an EM measurement, including a parameter of interest of the borehole, formation, or tool.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors.

The term "substantially real-time" as applied to methods of the present disclosure refers to an action performed while the BHA is still downhole and prior to the drill bit extending the borehole a distance of 1 meter, 0.5 meters, 0.25 meters, 0.1 meters, or less; and may be defined as estimation of true resistivity within 15 minutes of measurement, within 10 minutes of measurement, within 5 minutes of measurement, within 3 minutes of measurement, within 2 minutes of measurement, within 1 minute of measurement, or less. "Substantially different" as used herein means not substantially the same. "Substantially the same," or "substantially similar" as used herein means a value consistent with a general formation structure or feature, or having a value within a common statistical deviation, such as within one standard deviation, within 5 percent, within 1 percent of a moving average and so on. Substantially the same refers to values within the generally held value for common deviation, such as, for example, due to noise. "Borehole depth" refers to measured depth, or the depth that the distal end of the tool string has traveled along the borehole. Borehole depth will thus increase with extension of the borehole in a horizontal plane.

While the foregoing disclosure is directed to specific embodiments of the disclosure, various modifications will be apparent to those skilled in the art. It is intended that all variations be embraced by the foregoing disclosure.

What is claimed is:

1. A method of evaluating an earth formation intersected by a borehole, the method comprising:
   generating an excitation in the formation with an electromagnetic (EM) signal from a transmitter assembly at at least one frequency;
   making EM measurements using an EM tool on a tool string in the borehole by receiving a signal at at least one receiver assembly responsive to the excitation;
      wherein the at least one receiver assembly includes an induction antenna comprising a first winding and a second winding that share a common center tap, and wherein the average potential on the induction antenna is substantially the same as a ground potential.

2. The method of claim 1 wherein the common center tap is physically connected to ground.

3. The method of claim 1 wherein the at least one receiver assembly comprises a plurality of induction antennas with each antenna of the plurality separated from the other of the antennas of the plurality by a segment of the tool string and comprising a corresponding first winding and a corresponding second winding that share a corresponding common center tap.

4. The method of claim 1 wherein the first winding and the second winding overlap along a length of the tool string.

5. The method of claim 1 wherein the receiver assembly comprises a receiver electrically connected to the induction antenna by a balun transformer.

6. The method of claim 1 comprising wherein the transmitter assembly is on the tool string, the transmitter assembly comprising at least one of: i) a transmitter operatively electrically connected to another induction antenna by a balun transformer; and ii) a transmitter operatively electrically connected to the induction antenna by a balun transformer.

7. The method of claim 1 comprising using the at least one processor to perform at least one of: i) storing the measurements in a computer memory; ii) transmitting the measurements uphole; iii) processing the measurements in the borehole; or iv) displaying of the measurements to an operating engineer.

8. The method of claim 1 wherein the at least one receiver assembly maintains the average potential on the induction antenna substantially the same as a ground potential.

9. A method of evaluating an earth formation intersected by a borehole, the method comprising:
   generating an excitation in the formation with an electromagnetic (EM) signal from a transmitter assembly at at least one frequency;
   making EM measurements using an EM tool on a tool string by receiving a signal at at least one receiver assembly responsive to the excitation;
      wherein the at least one receiver assembly includes an induction antenna comprising a first winding and a second winding that share a common center tap, and a capacitive shield encompassing the induction antenna, the capacitive shield comprising a meander shaped isolation gap, and
      wherein the average potential on the induction antenna is substantially the same as a ground potential.

10. The method of claim 9 wherein the common center tap is physically connected to ground.

11. The method of claim 9 wherein the at least one receiver assembly comprises a plurality of induction antennas with each antenna of the plurality separated from the other of the antennas of the plurality by a segment of the tool string and comprising a corresponding first winding and a corresponding second winding that share a corresponding common center tap.

12. The method of claim 9 wherein the first winding and the second winding overlap along a length of the tool string.

13. The method of claim 9 wherein the receiver assembly comprises a receiver electrically connected to the induction antenna by a balun transformer.

14. The method of claim 9 comprising wherein the transmitter assembly is on the tool string, the transmitter assembly comprising at least one of: i) a transmitter operatively electrically connected to another induction antenna by a balun transformer; and ii) a transmitter operatively electrically connected to the induction antenna by a balun transformer.

15. The method of claim 9 wherein the at least one receiver assembly maintains the average potential on the induction antenna substantially the same as a ground potential.

16. An apparatus for evaluating an earth formation intersected by a borehole, the apparatus comprising:
    an electromagnetic (EM) tool configured for conveyance in the borehole on a tool string, and further configured to generate an excitation in the formation with an EM signal from a transmitter assembly on the tool at at least one frequency;
    at least one receiver assembly on the EM tool configured to make EM measurements by receiving a signal at the at least one receiver assembly responsive to the excitation;
    wherein the at least one receiver assembly includes an induction antenna comprising a first winding and a second winding that share a common center tap, and wherein the average potential on the induction antenna is substantially the same as a ground potential.

17. The apparatus of claim 16 further comprising the tool string.

18. The apparatus of claim 17 wherein the tool string is a drill string, and the apparatus comprises a drill bit at a distal end of the drill string.

19. A method of evaluating an earth formation intersected by a borehole, the method comprising:
    generating an excitation in the formation with an electromagnetic (EM) signal from a transmitter assembly at at least one frequency;
    making EM measurements using an EM tool on a tool string in the borehole by receiving a signal at at least one receiver assembly responsive to the excitation;
    wherein the at least one receiver assembly includes an induction antenna comprising a first winding and a second winding that share a common center tap, and wherein the at least one receiver assembly maintains the average potential on the induction antenna substantially the same as a ground potential.

* * * * *